(12) United States Patent
Mizue

(10) Patent No.: US 7,121,743 B2
(45) Date of Patent: Oct. 17, 2006

(54) OPTICAL MODULE

(75) Inventor: Toshio Mizue, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 144 days.

(21) Appl. No.: 10/717,908

(22) Filed: Nov. 21, 2003

(65) Prior Publication Data

US 2004/0151443 A1    Aug. 5, 2004

(30) Foreign Application Priority Data

Nov. 21, 2002  (JP) .......................... P2002-338417

(51) Int. Cl.
G02B 6/36 (2006.01)

(52) U.S. Cl. ........................ 385/92; 385/88

(58) Field of Classification Search ............ 385/88–92
See application file for complete search history.

(56) References Cited

U.S. PATENT DOCUMENTS

| | | | | |
|---|---|---|---|---|
| 4,961,098 A * | 10/1990 | Rosbeck et al. | ............ | 257/185 |
| 5,040,039 A * | 8/1991 | Hattori et al. | ............... | 257/463 |
| 5,061,977 A * | 10/1991 | Funaba | ....................... | 257/464 |
| 5,262,675 A * | 11/1993 | Bausman, Jr. | ............... | 257/714 |
| 5,281,829 A * | 1/1994 | Chinen | ......................... | 257/80 |
| 6,247,851 B1 * | 6/2001 | Ichihara | ....................... | 385/56 |
| 6,313,525 B1 * | 11/2001 | Sasano | ......................... | 257/704 |
| 6,430,061 B1 * | 8/2002 | Grant et al. | ................. | 361/816 |
| 6,461,058 B1 * | 10/2002 | Birch et al. | .................... | 385/92 |
| 6,485,197 B1 * | 11/2002 | Kato | ............................ | 385/92 |
| 6,619,859 B1 * | 9/2003 | Minamino et al. | ............ | 385/92 |
| 6,652,158 B1 * | 11/2003 | Bartur et al. | ................. | 385/92 |
| 6,655,855 B1 * | 12/2003 | Nakura et al. | ................ | 385/92 |
| 6,659,657 B1 * | 12/2003 | Lin et al. | ...................... | 385/92 |
| 6,833,999 B1 * | 12/2004 | Go | ............................. | 361/813 |
| 2002/0126456 A1 | 9/2002 | Sato et al. | | |
| 2003/0021310 A1 | 1/2003 | Harding | | |
| 2003/0126456 A1 | 7/2003 | Birzer et al. | | |
| 2004/0105633 A1 | 6/2004 | Ishikawa et al. | | |
| 2005/0158052 A1 * | 7/2005 | Larson | ....................... | 398/135 |

* cited by examiner

*Primary Examiner*—Ellen E. Kim
(74) *Attorney, Agent, or Firm*—McDermott Will & Emery LLP

(57) ABSTRACT

The optical module includes a housing, an optical subassembly, a support and a thermal sheet. The housing has a base and a cover. The support having two leg portions and a bridge connecting these leg portions is placed on the bottom surface of the base. The optical subassembly is disposed between the leg portions without in contact with the bridge. The thermal sheet is provided between the bridge of the support and the cover. Heat generated in the optical subassembly is transferred in sequence to the leg portions, the bridge, the thermal sheet and the cover.

17 Claims, 11 Drawing Sheets

OPTICAL MODULE

BACKGROUDN OF THE INVENTION

1. Field of the Invention

The present invention relates to an optical module.

2. Related Prior Art

An optical module generally has an optical subassembly provided inside a package having a cover. The optical subassembly generates heat. In order to dissipate this heat, the optical module includes a thermal sheet that is directly in contact with both the cover and the optical subassembly. The heat from the optical subassembly is transmitted to the cover through the thermal sheet.

This thermal sheet may be deformed between the cover and the optical subassembly, and applies stresses on the cover and the optical subassembly. Stresses applied thereto are in a direction in which the optical axis of the optical module is displaced. If the stress is large, the alignment accuracy of the optical subassembly is degraded.

Moreover, when the optical subassembly is aligned to an optical fiber and secured individual optical module with good optical coupling, the alignment therebetween differs in each individual optical module. Accordingly, a thick thermal sheet is used to adapt to the individual module and to ensure the heat dissipation from the optical subassembly to the cover. However, the thermal resistance of the thermal sheet along its thickness direction becomes larger as the thickness thereof is large, thereby reducing the efficiency of the heat dissipation.

SUMMARY OF THE INVENTION

It is an object of the present invention to provide an optical module having good heat dissipation with maintaining an precise optical alignment.

One aspect of the present invention, the optical module comprises an optical subassembly, a housing, a support and a thermal sheet. The optical subassembly includes a semiconductor optical device. The housing includes a cover and a base having a bottom surface thereof. The optical subassembly is provided between the base and the cover. The support is provided on the base and in contact with the optical subassembly. The thermal sheet is provided between the cover and the support.

In the optical module according to the present invention, the support includes a first leg portion, a second leg portion and a bridge connecting the first and second leg portions with each other. The cover and the bridge sandwich the thermal sheet therebetween. The optical subassembly is provided between the first and second leg portions. The first and second leg portions are preferably in contact with the optical subassembly with solders provided therebetween.

In the optical module according to the present invention, the optical subassembly includes a stem for mounting the semiconductor optical device thereon. The stem has an outer surface. The first and second leg portions preferably have a finger curved so as to be in contact with the outer surface of the stem, respectively. The finger is in contact with the stem with a solder provided therebetween. The outer surface of the stem is spaced from the bridge of the support.

In the optical module according to the present invention, the support preferably has another bridge for securing the finger with the first and second leg portion. A level of the bridge relative to the bottom surface of the base is greater than a level of another bridge relative to the bottom surface of the base. The another bridge is also spaced from the outer surface of the stem.

The support preferably further includes first and second arms provided on sides of the first and second leg portions for connecting another bridge to the first and second leg portions. The first and second arms are connected with each other by another bridge. The another bridge has an inner side facing to the bridge and the finger is provided on the inner side.

The optical module of the present invention may further comprise a circuit board provided in the housing. The optical subassembly has a lead terminal connected to the circuit board.

DETAILED DESCRIPTION OF THE PREFERRED EMBODIMENTS (First Embodiment)

Figure 1:
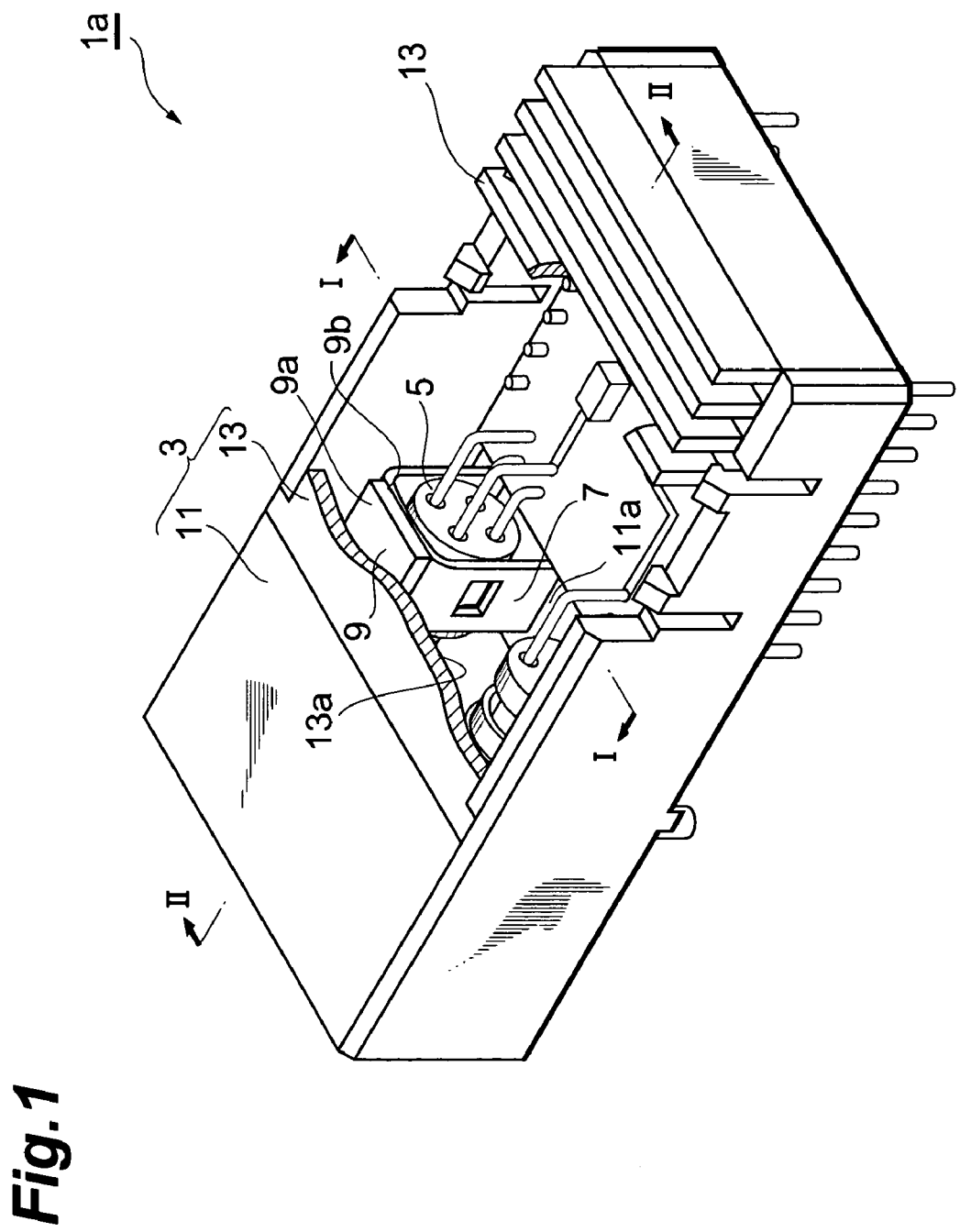
FIG. 1 is a view showing an optical module according to the first embodiment.
Figure 2:
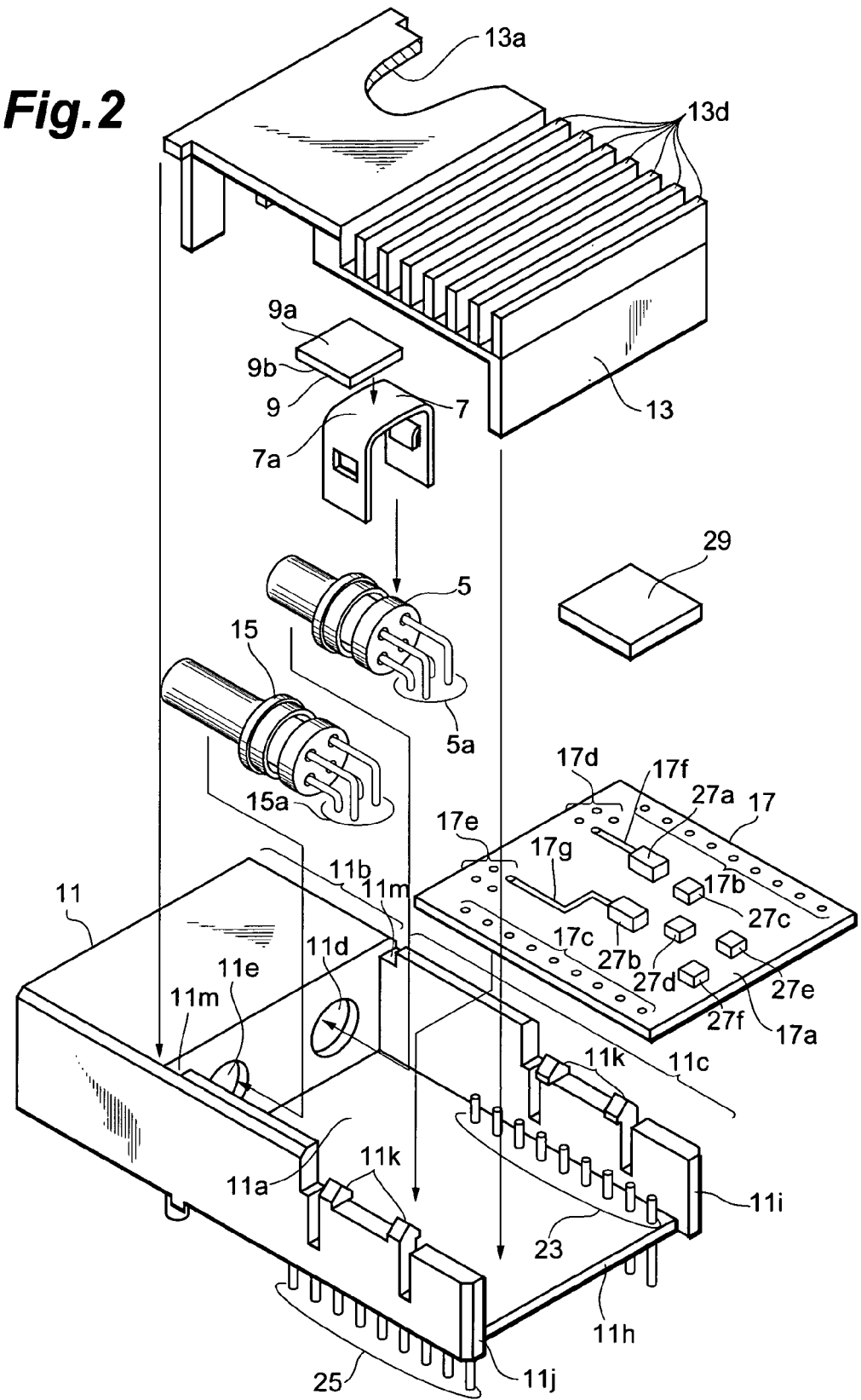
FIG. 2 is an exploded view of the optical module.

FIG. 1 is a partially perspective vie showing an optical module according to the first embodiment. FIG. 2 is an exploded view showing the components of an optical module according the first embodiment.

The optical module 1a comprises a housing 3, an optical subassembly 5, a support 7, and a thermal sheet 9. The housing 3 has a base 11 and a cover 13. The optical subassembly 5 is supported by the housing and is aligned in a predetermined axial direction. The support 7 is placed on a bottom surface 11a of the base 11. Since the thermal sheet 9 is sandwiched between the support 7 and the cover 13, the cover 13 and the support deform the thermal sheet 9. The repulsive stress due to the deformation is applied to the cover 13 and the support 7. The optical subassembly 5 receives this repulsive stress through the support 7.

Since the support 7 is in contact with the optical subassembly 5, the heat generated by the optical subassembly 5 is transmitted to the housing 3 through the support 7 and the thermal sheet 9.

A first surface 9a of the thermal sheet 9 is in contact with a bridge 7a of the support 7, and a second surface 9b is in contact with the cover 13. The thermal sheet 9 can be deformed when positioned between the bridge 7a and the cover 13, so that the area of the first surface 9a in contact with the bridge 7a can become larger and the area of the second surface 9b in contact with the surface 13a of the cover 13 can also become larger.

This deformation of the thermal sheet 9 may be an elastic deformation or a plastic deformation. The flexibility permits the thermal sheet 9 to be tightly in contact with the support 7 and the cover 13, thereby enhancing heat transfer from the support to the cover 13.

The thermal sheet 9 is preferably made of silicon gel. The silicon gel may contain at least one of the following ingredients: metal pieces; metal powders; ceramic pieces; and/or ceramic powders. These ingredients have greater thermal conductivity than the silicon gel itself.

In an optical module without the support 7, a relatively thicker thermal sheet may be necessary to adjust an unevenness in the optical alignment with differs from each individual optical module. On the other hand, the present optical module 1a has the support 7 and the thermal sheet 9 thinner than that used in the conventional optical module, so that the heat dissipation from the optical subassembly 5 to the cover 13 through the thermal sheet can be effected. The heat from the optical subassembly 5 is conducted, in sequence, to the first and second leg portions 7b and 7c, the bridge 7a, the thermal sheet 9 and the cover 13.

Figure 3:
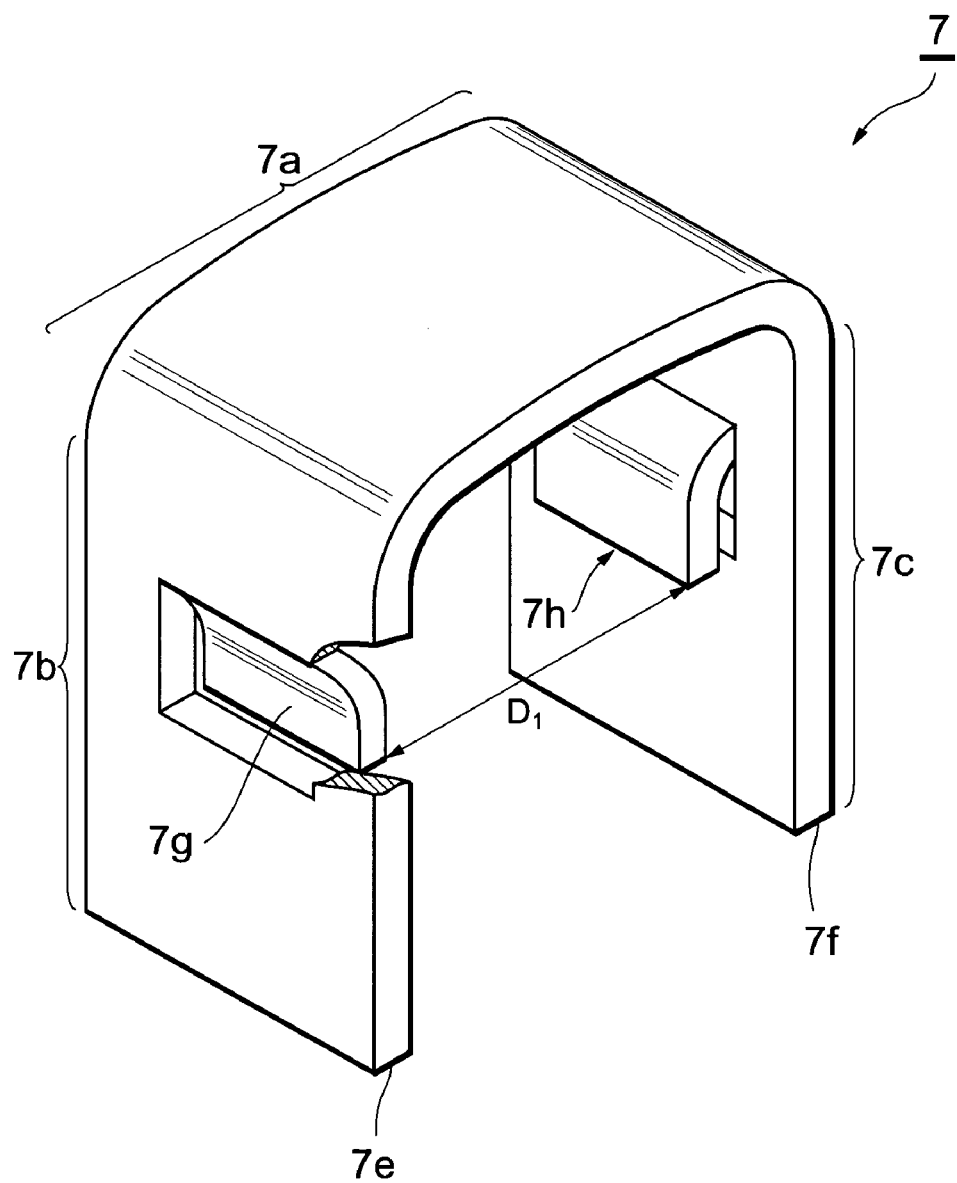
FIG. 3 is a view showing a support in the optical module.

FIG. 3 is a view showing the support 7 having the first and second leg portions 7b and 7c, which are in contact with the optical subassembly 5. The bridge 7a connects the first leg portion 7b and the second leg portion 7c. The tips 7e and 7f of the respective leg portions 7b and 7c face to the bottom surface 11a of the base 11. The bridge 7a is in contact with the thermal sheet 9. In one example, each of the bridge 7a, the first and second leg portions 7b and 7c is plate-shaped.

The first and second fingers 7g and 7h are in contact with the optical subassembly 5. The contact between the optical subassembly 5 and the support 7 can be achieved by the elasticity of the first and second fingers 7g and 7h. The first finger 7g is a piece extending inwardly from the first leg portion 7b, and bends more easily than the first leg portion 7b. The second finger 7h also as a similar structure to that of the first finger 7g.

The first and second fingers 7g and 7h are curved in the opposite directions from the leg portions 7b and 7c, respectively. The first and second fingers 7g and 7h are in direct contact with the optical subassembly 5. Then, the fingers 7g and 7h apply stress to the optical subassembly 5. The combined stress acting from the support 7 to the optical subassembly 5 through the finger 7g and 7h is extremely small because the directions of stresses are substantially opposite direction to each other and the magnitudes thereof are nearly equal to each other. Consequently, the optical subassembly 5 receives very small combined stress, i.e., substantially no stress, in a direction in which the axis of the optical subassembly may be displaced.

In order that the optical subassembly 5 is able to be reliably in contact with the first and second fingers 7g and 7h, the interval $D_1$ between the first finger 7g and the second finger 7h is nearly equal to, or slight smaller than the width of the optical subassembly 5. In the case that $D_1$ is greater than the above width, the fingers 7g and 7h may be connected with the optical subassembly 5 via solders.

The bridge 7a may be deformed due to a stress applied by the cover 13 and the thermal sheet 9, and the first and second leg portions 7b and 7c maybe slightly deformed due to the deformation of the bridge 7a. Namely, stresses from the cover 13 and the thermal sheet 9 are applied to both ends 7e and 7f of the leg portions 7b and 7c. The fingers 7g and 7h are hardly deformed by the deformation of the first and second leg portions 7b and 7c, that is, the thermal sheet 9 does not apply any stress directly to the optical subassembly 5. Since the stiffness of the support 7 is greater than that of the thermal sheet 9, the deformation of the support 7 can be sufficiently small. For example, the Young's modulus of the thermal sheet is 2.94 to 7.84 MPa (0.3 to 0.8 kgf/mm$^2$), while that of the support 7 made of metal is 20580 MPa (2100 kgf/mm$^2$)

Preferably, the thermal sheet 9 may have a thermal conductivity of 0.5 W/m/K or more and 50 W/m/K or less. More preferably, the thermal sheet 9 made of silicon gel may have a thermal conductivity of 2 W/m/K or more and 20 W/m/K or less.

Preferably, the thermal sheet 9 may have shore hardness of 10 or more and 100 or less. More preferably, the thermal sheet 9 may have shore hardness of 15 or more and 50 or less.

Referring to FIG. 2, the base 11 installs a circuit board 17 on which a number of electronic components 27a to 27f is mounted. The electronic component 27a is connected to the optical subassembly 5 via a wiring pattern 17f on the surface 17a, and the electronic component 27b is connected to an optical subassembly 15 via a wiring pattern 17g on the surface 17a. The circuit board 17 has rows of holes 17b and 17c to be connected with lead terminals 23 and 25, and has holes 17d and 17e to be respectively connected with a lead terminal 5a and 15a of the optical subassemblies 5 and 15. Other electronic components 27c to 27f are also mounted on the circuit board 17.

Figure 4:
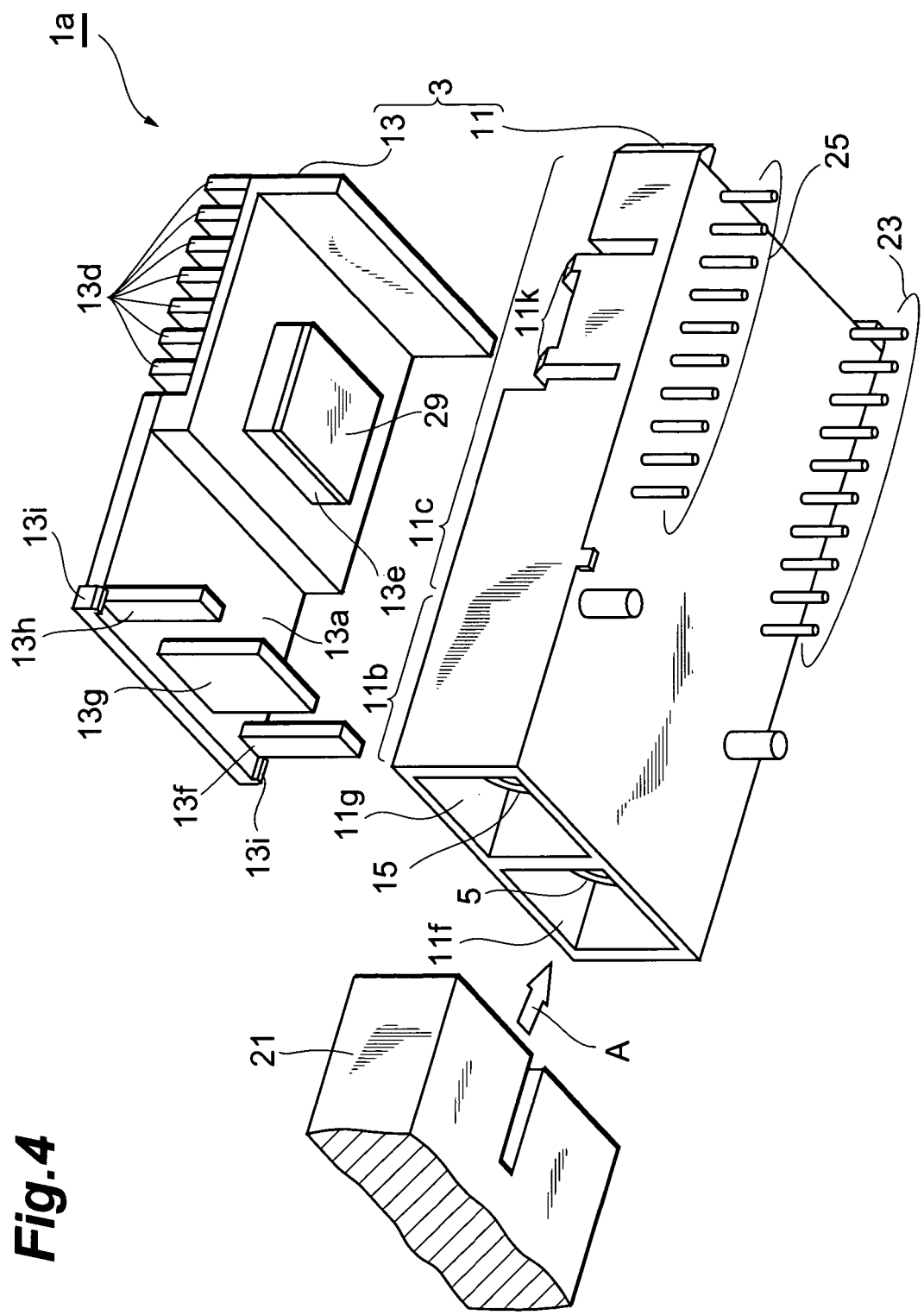
FIG. 4 is a perspective view showing the optical module.
Figure 5:
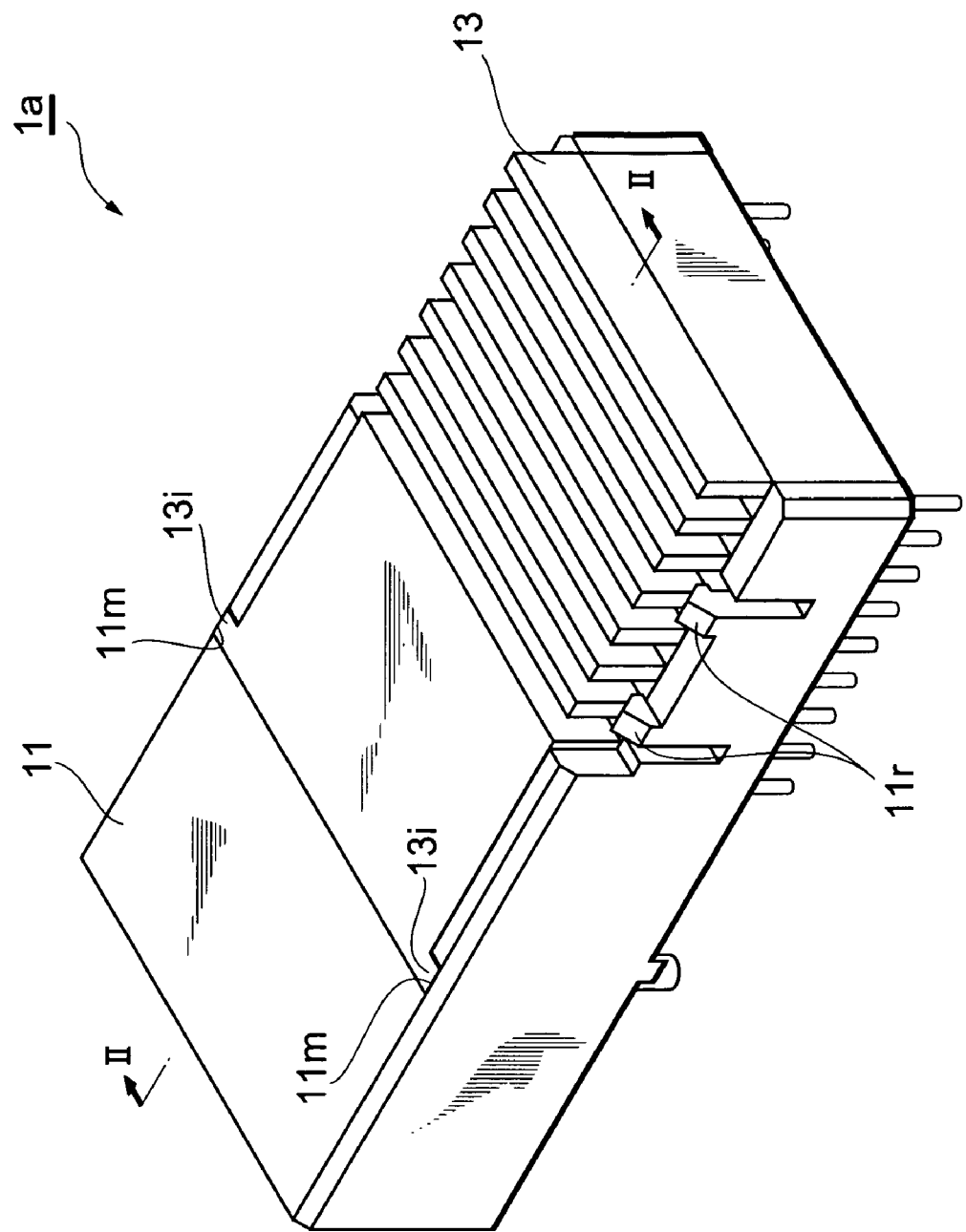
FIG. 5 is a perspective view showing the optical module.

FIGS. 4 and 5 are perspective views showing the optical module 1a. The base 11 and the cover 13 will be described with reference to FIGS. 2, 4, and 5. In a preferred embodiment, the base 11 is made of a synthetic resin and the cover 13 is made of metal.

As shown in FIG. 4, the receptacle portion 11b is provided adjacent to the component enclosing portion 11c. The receptacle portion 11b has receptacles 11f and 11g into which an optical connector 21 is mated. As shown in FIG. 2, the receptacles 11f and 11g communicates with the component enclosing portion 11c via holes 11d and 11e, respectively. The optical subassemblies 5 and 15 are inserted into these holes 11d and 11e such that the front ends thereof are stuck out the receptacles 11f and 11g.

As shown in FIG. 2, the component enclosing portion 11c has a bottom 11h with a surface 11a, on which the support 7 is placed, and a pair of side walls 11i and 11j extending along the predetermined axis. Two rows of lead terminals 23 and 25 are arranged along the pair of side walls 11i and 11j, each of which has a latch 11k and a cut 11m.

The cover 13 has one or more thermal fins 13d on the outer surface thereof, and at least one projections 13e with another thermal sheet 29 on the inner surface thereof. The thermal sheet 29 is in contact with the electronic components 27a and 27b on the circuit board 27. The thermal sheet 29 may be made of the same material as or similar material to the thermal sheet 9. Heat from the electronic components 27a and 27b is transferred to the thermal fins 13d via the thermal sheet 29 and the projections 13e, and the transferred heat is dissipated into the air.

The cover 13 has guides 13f and 13g to align the optical subassembly 5. Namely, the optical subassembly, the front end of which is inserted into the hole 1id, is secured by sandwiching its flange provided in the outer surface with the end surface of the receptacle portions and the guides 13f and 13g therebetween. The cover 13 also has another guide 13h. The guides 13g and 13h are provided to secure another optical subassembly 15 by co-operating with the hole 11e.

The cover 13 has projections 13*i* to be mated with the cuts 11*m* provided in the base 11. The cuts 11*m* and the projections 13*i* position the base 11 and the cover 13 to each other. Moreover, the latch 11*r* of the base 11 is fitted into the cover 13, thereby securing the base 11 and the cover 13 to each other.

Figure 6A:
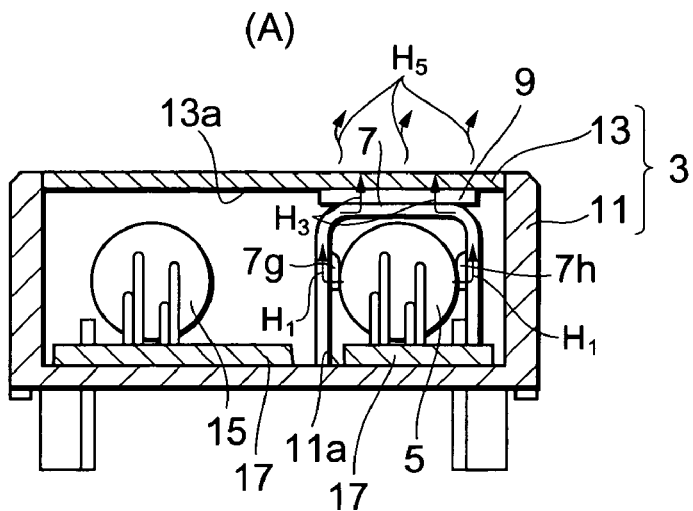
FIG. 6A is a cross sectional view showing the optical module taken along the line II—II in FIGS. 1 and 5.
Figure 6B:
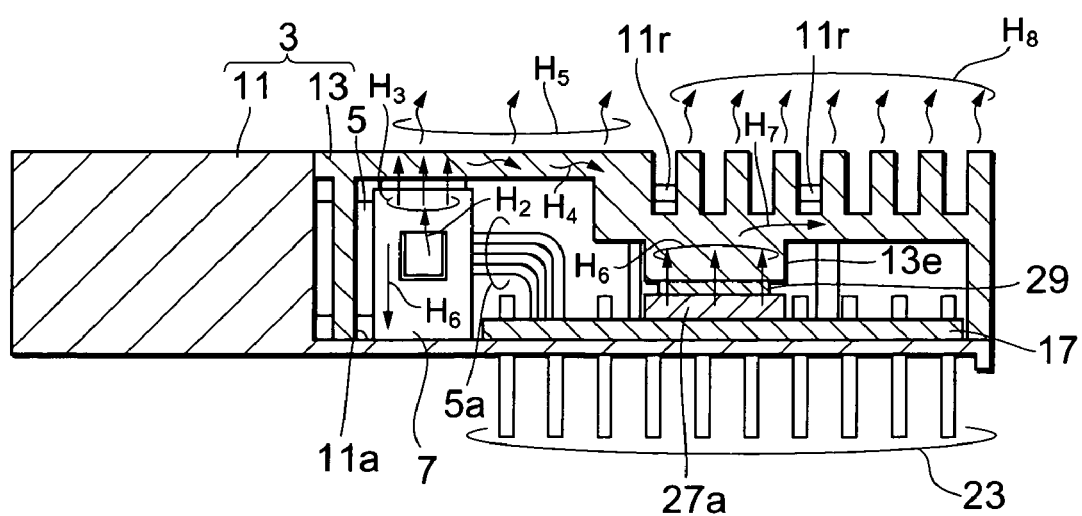
FIG. 6B is a sectional view showing the optical module taken along the line I—I in FIG. 1.

FIG. 6A is a cross sectional view showing the optical module taken along the ling I—I shown in FIGS. 1 and 5, and FIG. 6B is across sectional view showing the optical module taken along the ling II—II shown in FIG. 1. The optical subassembly 5 is supported in a housing 3, and the lead terminal 5*a* of the optical subassembly 5 is connected to the circuit board 17. Although the optical subassembly 5 is in contact with the fingers 7*g* and 7*h*, and the support 7 receives stresses from the base 11 and the cover 13 via the thermal sheet 9, the optical alignment of the optical subassemblies 5 and 15 is maintained.

As shown in FIGS. 6A and 6B, the heat $H_1$ generated by the optical subassembly 5 is transmitted to the support 7 via the fingers 7*g* and 7*h*. The heat $H_2$ is transmitted from the fingers 7*g* and 7*h* to the leg portions 7*b* and 7*c*. The heat $H_3$ is transmitted to the cover 13 through the thermal sheet 9. A part of the heat $H_3$ becomes the heat $H_4$ transmitted in the medium of the cover 13. The remaining of the heat $H_3$ and the heat $H_4$ is dissipated into the air from the cover 13 as the heat $H_5$.

The heat $H_6$ generated by the electronic component 27*b* is transmitted via the thermal sheet 29 to the projection 13*e*. A part of the heat $H_6$ becomes the heat $H_7$ that is conducted in the medium of the cover 13. The remaining of the heat $H_6$ and the heat $H_7$ are dissipated into the air through the cover 13 as the heat $H_8$.

As seen from the description as above, if the support 7 is used, it is possible to reduce the stress received from the housing 3 to the optical subassembly 5 and to provide a thermal path for dissipating heat from the optical subassembly 5. Due to the deformation of the thermal sheet 9, the contact area between the support 7 and the thermal sheet 9 is increased and the contact area between the cover and the thermal sheet 9 is also increased. Furthermore, the deformation of the thermal sheet 9 reduces the stress from the housing 3 to the optical subassemblies via the support 7.

Without the support 7, heat from the optical subassembly can be transferred through a thermal sheet which is directly in contact with the optical subassembly, but, due to the direct contact, stress from the housing is also directly applied to the optical subassembly. As a consequence, the stress to the thermal sheet may deviate the optical alignment of the optical subassembly. In addition, if the housing 3 is thermally deformed, the deformed housing 3 affects another stress on the optical subassembly via the heat transfer sheet and may reduce the accuracy of the optical alignment.

(Second Embodiment)

Figure 7A:
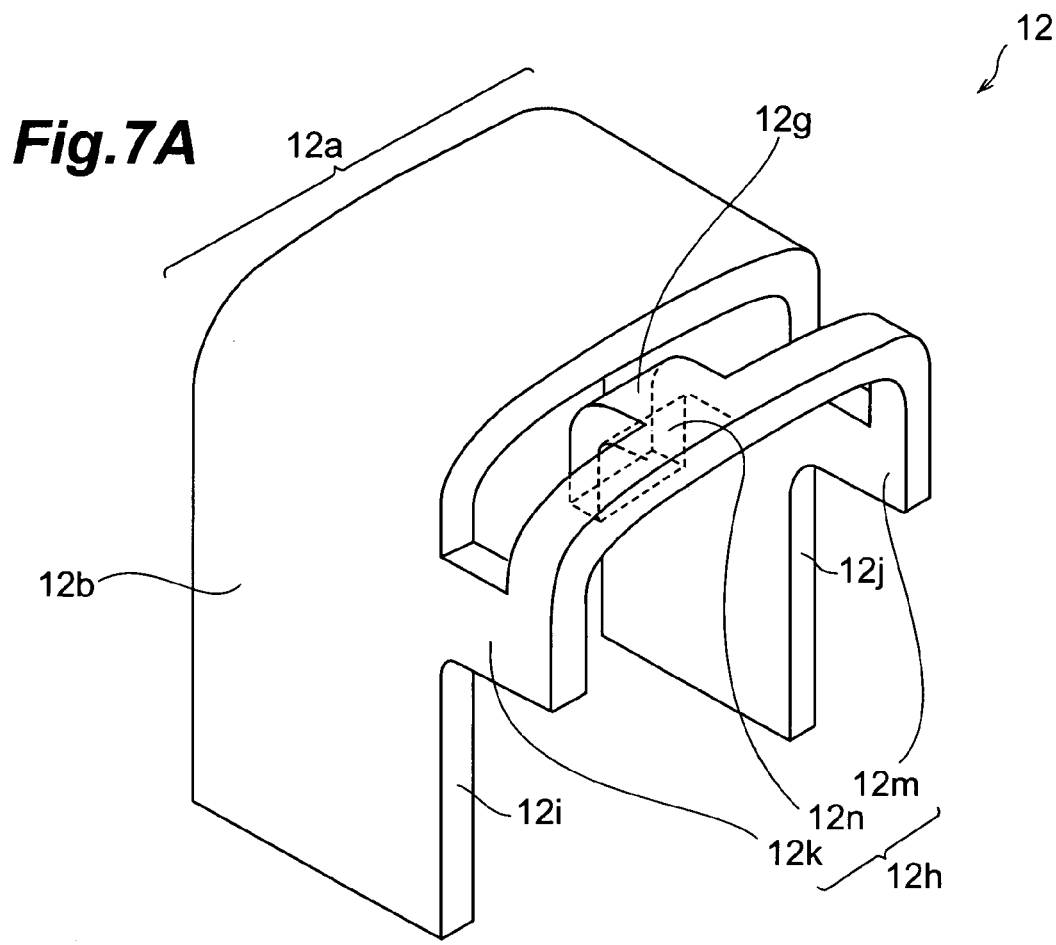
FIGS. 7A and 7B are views showing a support according the second embodiment in the optical module.
Figure 7B:
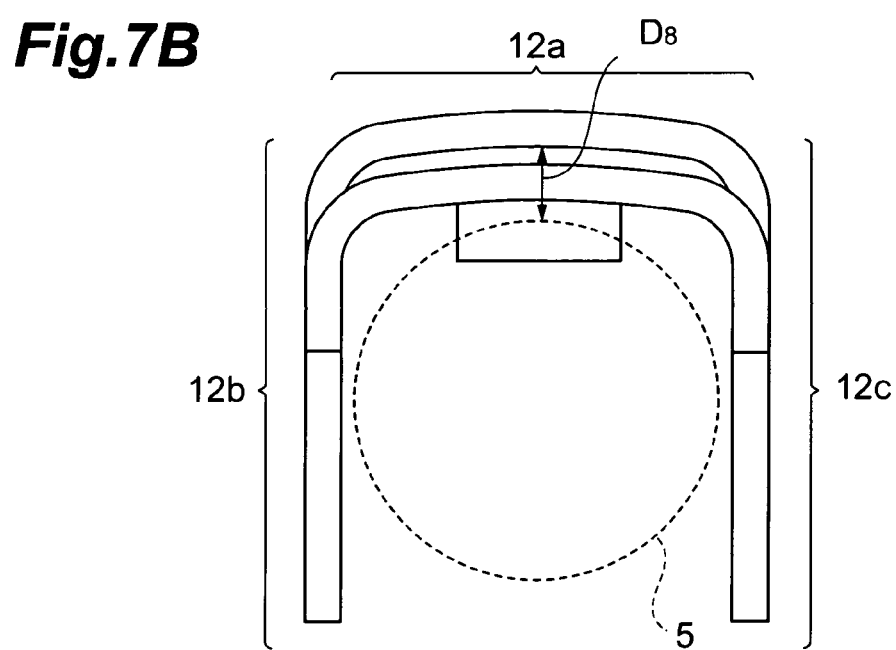

FIGS. 7A and 7B are view showing a support 12 according to the second embodiment of the present invention.

In the support 12, a bridge 12*a* connects one end of a first leg portion 12*b* and one end of a second leg portion 12*c* with each other. The support 12 also has a finger 12*g*, which is curved so as to be in contact with a stem of the optical subassembly 5.

The support 12 has a connecting portion 12*h* that connects the first and/or second leg portions 12*b* and 12*c* with the finger 12*g*. The connecting portion 12*h* has first and second arms 12*k* and 12*m*. The first and second arms 12*k* and 12*m* are provided on sides 12*i* and 12*j* of the first and second leg portions 12*b* and 12*c*, respectively. The first arm 12*k* is connected to the second arm 12*m* by way of another bridge 12*n*. The finger 12*g* is located in the bridge 12*n*. The finger 12*g* extends from the inner edge facing to the bridge 12*a* and is then curved downwards. The finger 12*g* has a surface to be secured to the optical subassembly 5.

Referring to FIG. 7B, the level of the bridge 12*a* relative to the bottom surface 11*a* is greater than that of the other bridge 12*n* when the support 12 is placed on the bottom surface 11*a*. Furthermore, the side surface of the optical subassembly 5 is separated by the distance of $D_7$ from the bridge 12*a* as shown in FIG. 7B. Moreover, the other bridge 12*n* is separated from the thermal sheet 9.

Since the finger 12*g* is in contact with the optical subassembly 5, heat from the optical subassembly is transmitted to the housing 3 through the finger 12*g*, the other bridge 12*n*, the first and second arms 12*k* and 12*m*, the first and second leg portions 12*b* and 12*c*, the bridge 12*a*, and the thermal sheet 9. Although the support 12 receives stress from the cover 13 via the thermal sheet 9, this stress is applied only to the support 12 and is not directly applied to the optical subassembly 5.

(Third Embodiment)

Figure 8A:
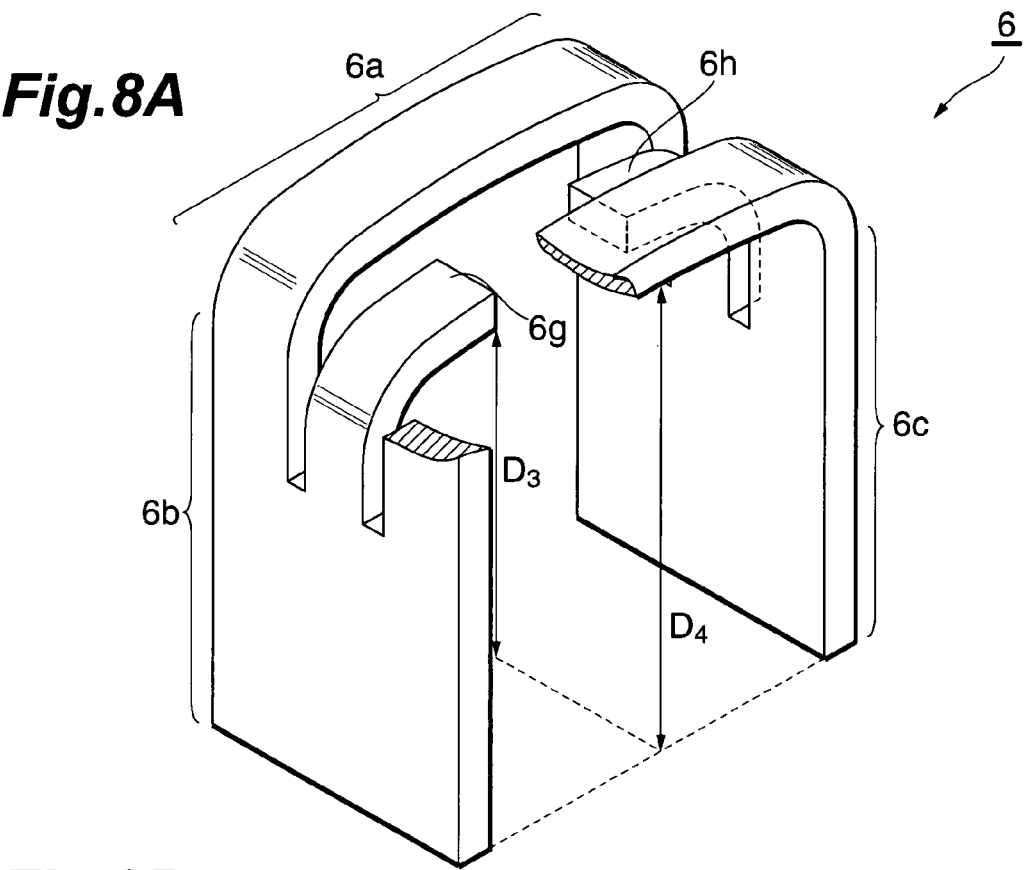
FIGS. 8A and 8B are showing a support according to the third embodiment.
Figure 8B:
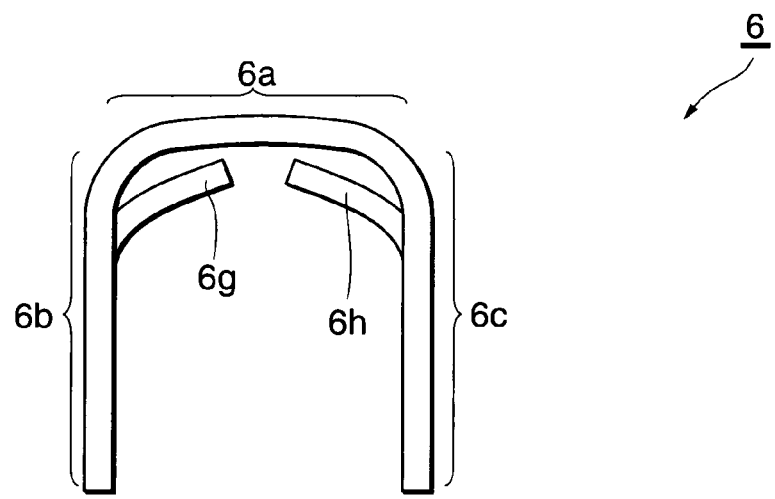

FIGS. 8A and 8B are view showing a support 6 having a bridge 6*a* and first and second leg portions 6*b* and 6*c*. The support 6 has first and second fingers 6*g* and 6*h* that are secured to the optical subassembly 5 by solders. The first and second fingers 6*g* and 6*h* and the solders provide paths for heat transferring from the surface of the optical subassembly 5 to the support 6.

As shown in FIG. 8B, the first and second fingers 6*g* and 6*h* are curved inward so that gaps between the optical subassembly 5 and the first and second fingers 6*g* and 6*h* are formed when the optical subassembly 5 has been positioned. After positioning the support 6 and the optical subassembly 5 to each other, solder is supplied between the optical subassembly 5 and the first and second fingers 6*g* and 6*h*. The solders fill up with the gaps between the optical subassembly 5 and the first and second fingers 6*g* and 6*h*, respectively.

In the support 6 shown in FIG. 8A, the maximum level $D_3$ of the first and second fingers 6*g* and 6*h* to the bottom surface 11*a* is smaller than the maximum level $D_4$ of the bridge 6*a* from the bottom surface 11*a*. It is possible for the optical subassembly 5 to be in contact with the fist finger 6*g* and the second finger 6*h* with solders without in contact with the bridge 6*a*.

(Fourth Embodiment)

Figure 9A:
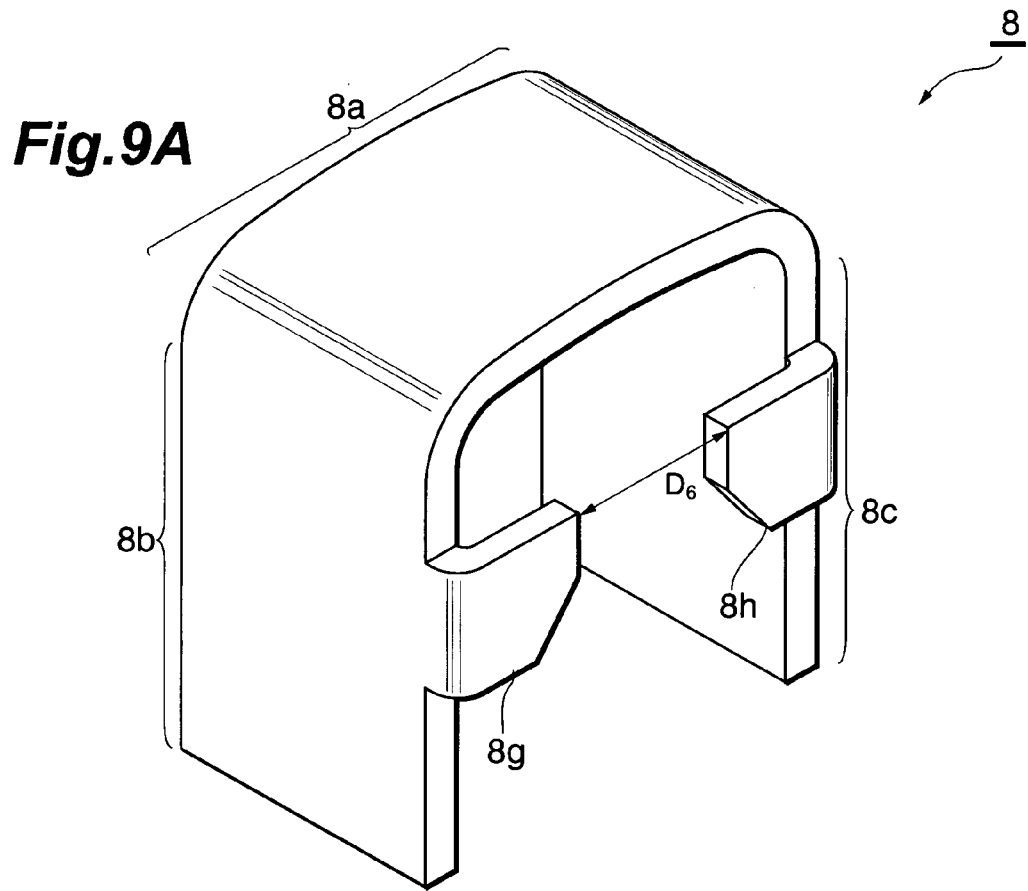
FIGS. 9A and 9B are view showing a support according to the fourth embodiment.
Figure 9B:
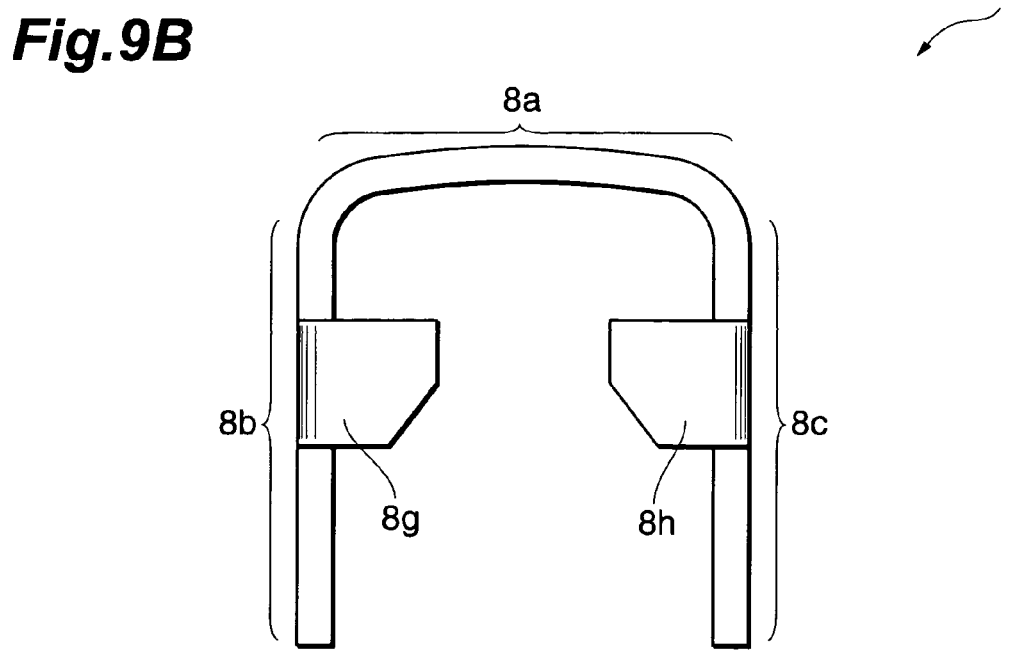
Figure 10:
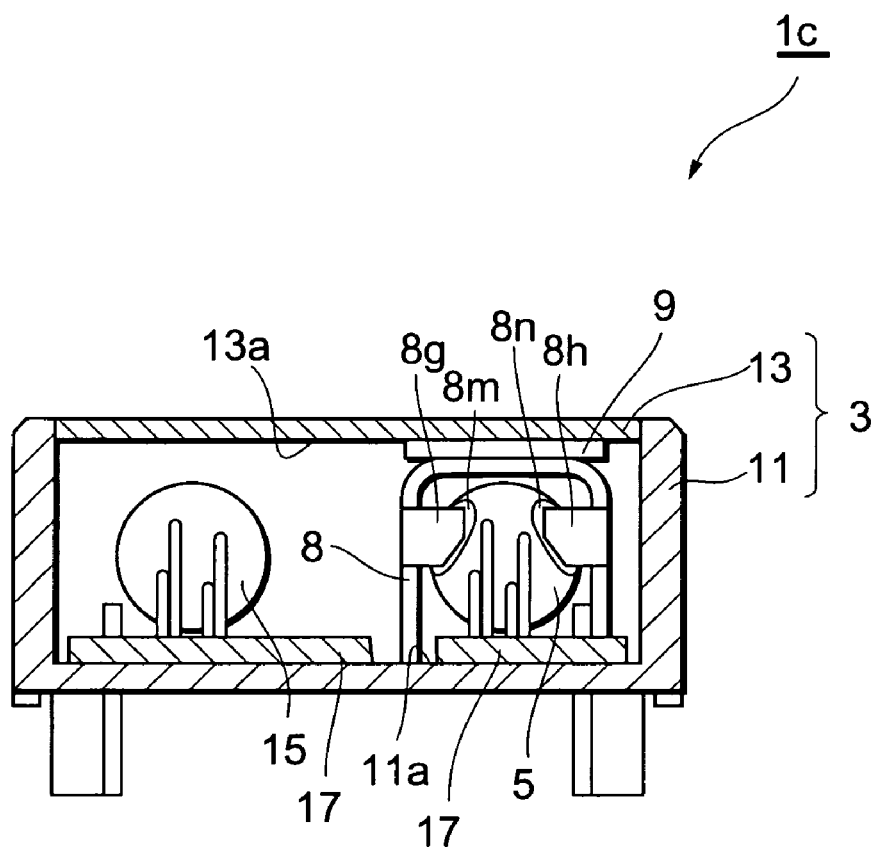
FIG. 10 is a cross sectional view showing the optical module.

FIGS. 9A and 9B are view showing the support 8 according to the fourth embodiment of the invention. The support 8 is connected to the optical subassembly 5 with solders 8*m* and 8*n* as illustrated in FIG. 10, and heat from the optical subassembly 5 is transmitted to the housing 3 through the first and second leg portions 8*b* and 8*c*, the bridge 8*a*, and the thermal sheet 9. Although the cover 13 applies stress to the support 8, the stress is not directly applied to the optical subassembly by a similar mechanism described above.

The bridge 8*a* connects the first and second leg portions 8*b* and 8*c* with each other and the first and second leg portions 8*b* and 8*c* provide the optical subassembly therebetween. The first finger 8*g* extends from the first leg portion 8*b* and the second finger 8*h* extends from the second leg portion 8*c*. The first and second fingers 8*g* and 8*h* are curved inwardly. FIG. 10 is a cross sectional view showing the optical module according to the present embodiment. The first and second fingers 8*g* and 8*h* are in contact with the optical subassembly 5 with solders. Although the optical subassembly 5 receives stress from the support 8 in the direction of the optical axis thereof, the support 8 does not apply any stress to the optical subassembly 5 in a direction intersecting to the optical axis. As a consequence, the stress from the support 8 to the optical subassembly 5 does not act so as to displace the optical subassembly 5.

Since the minimum interval $D_6$ between the first finger 8g and the second finger 8h is smaller than the width if the optical subassembly 5 can be in contact reliably with the first and second fingers 8g and 8h without in contact with the bridge 8a and the first and second leg portions 8b and 8c. In order to avoid touching to lead terminals, the widths of the fingers 8g and 8h are narrowed gradually as they approach the tip thereof.

Figure 11A:
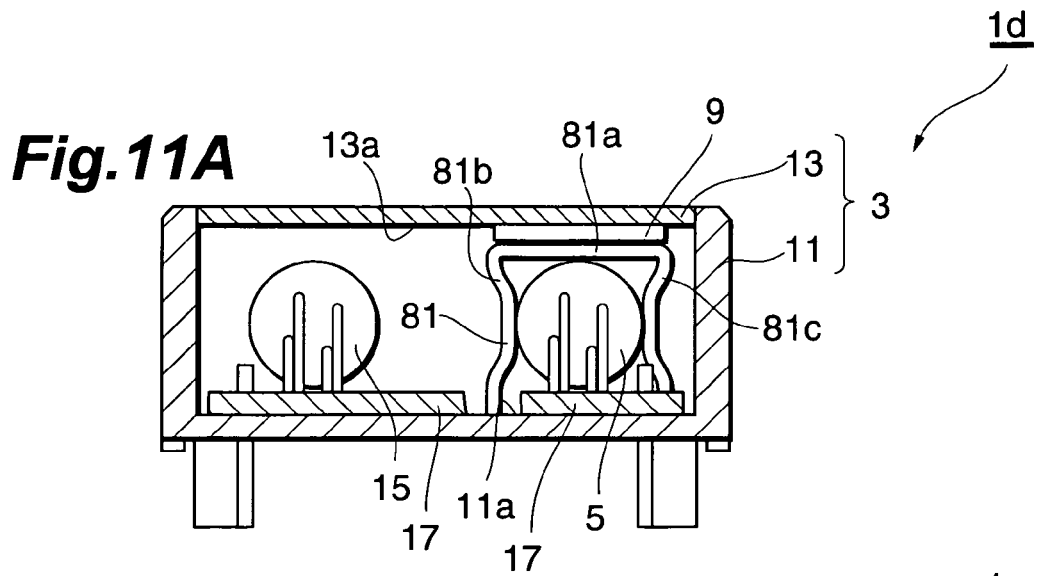
FIGS. 11A to 11C are view showing modified supports.
Figure 11B:
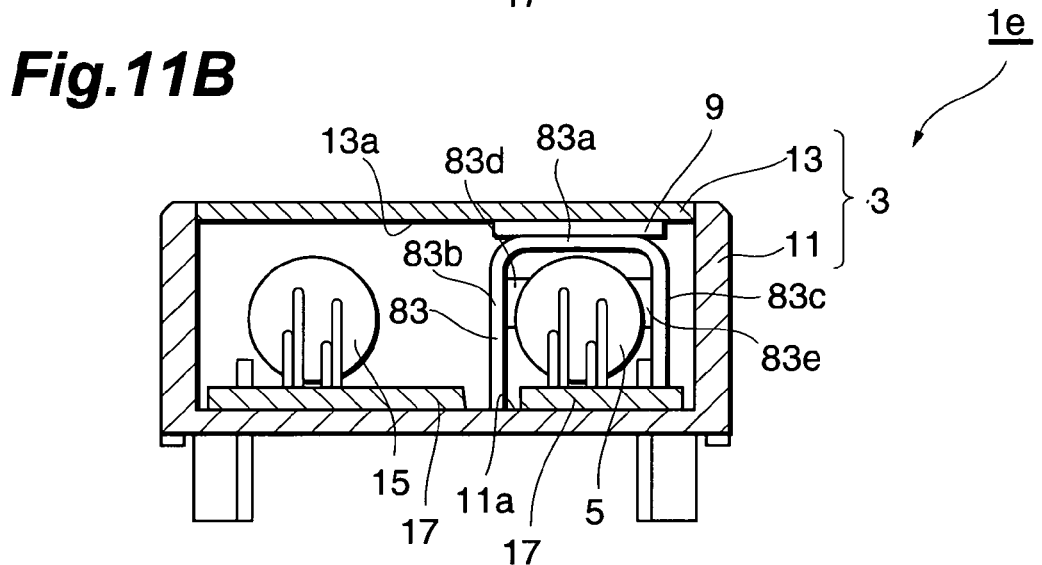
Figure 11C:
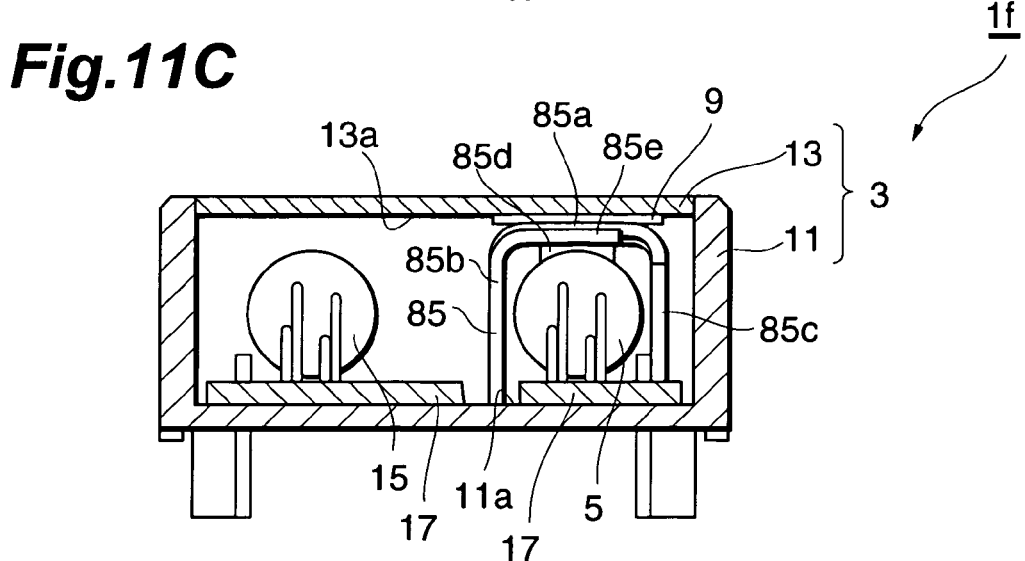

FIGS. 11A to 11C are view showing still the other supports. Referring to FIG., 11A, a support 81 in an optical module 1d has a bridge 81a and first and second leg portion 81b and 81c, each having a first and second segments. The interval between the first segments is larger than the width of the optical subassembly 5, while the second segments thereof are curved inward such that the interval between the second segments is substantially equal to or slightly smaller than the width of the optical subassembly 5. The optical subassembly 5 is disposed in contact with the second segments.

Referring to FIG. 11B, a support 83 in an optical module 1e has a bridge 83a and first and second leg portion 83b and 83c. The interval between a first leg portion 83b and a second leg portion 83c is slightly larger than the width of the optical subassembly 5. Solders 83d and 83e are provided between the optical subassembly 5 and the first and second leg portions 83b and 83c. The bridge 83a may be slightly deformed due to stress applied from the housing 3 in the present support 83, too. However, stress caused by the slight deformation may be applied to the optical subassembly 5 connected respectively to the first and second leg portions 83b and 83c through the solders 83 and 83e.

Referring to FIG. 11C, a support 85 in an optical module 1f has a bridge 85a and first and second leg portion 85b and 85c. The interval between the first leg portion 85b and the second leg portion 85c is larger than the width of the optical subassembly 5. The level of the bridge 85a relative to the bottom surface 11a is greater than the level of an extension 85e of the support 85. The thermal sheet 9 is provided between the bridge 85a and the cover 13 without in contact with the extension 85e. A solder 85d is filled between the extension 85e and the optical subassembly 5 to provide a path for the heat transferring from the optical subassembly 5. Since the optical subassembly 5 is in contact with the extension 85e and is not in contact with the bridge 85a, the optical subassembly does not directly receive any stress caused by deformation of the bridge 85a.

From the invention thus illustrated and described in preferred embodiments thereof, it is understood by those having skill in the art that the invention can be modified in arrangement and detail without departing from such principles. For example, the structures of the optical module and of the support are not limited to the specific structures described in the embodiment. Although the embodiments describe the optical module having the thermal sheet adapted to the one of the optical subassembly, the optical module that has the thermal sheet adapted to both of the optical subassemblies. In such a configuration, one optical subassembly is directed to a transmitting optical subassembly and the other is directed to a receiving optical subassembly. Further, the embodiments are adapted to a configuration in which the optical fiber optically couples to the optical semiconductor device by inserting the optical connector into the receptacle provided in the module. However, another configuration may be considered that the optical fiber permanently couples to the semiconductor device, that is, the pig-tailed type optical coupling may be also applicable to the present invention. We therefore claim all modifications and variations coming within the spirit and scope of the following claims.

What is claimed is:

1. An optical module comprising:
   an optical subassembly including a semiconductor optical device therein, the optical subassembly having a co-axial shape;
   a support including first and second leg portions and a bridge connecting the first and second leg portions, the first and second leg portions securing the optical subassembly therebetween by being in contact with the optical subassembly;
   a housing including a base and a cover, the base having a bottom surface for providing the optical subassembly and the first and second leg portions of the support thereon; and
   a thermal sheet provided between the cover and the bridge,
   wherein the support reduces a stress applied to the optical subassembly from the cover through the thermal sheet by ends of the respective leg portions thereof coming in contact to the bottom surface of the base and forms a thermal path from the optical subassembly to the cover.

2. The optical module according to claim 1, wherein the optical subassembly has a stem for mounting the semiconductor optical device thereon, and
   the support further includes a finger curved to be in contact with the stem.

3. The optical module according to claim 2, wherein the outer surface of the optical subassembly is spaced from the bridge.

4. The optical module according to claim 2, wherein the finger is in contact with the stem with a solder provided between the stem and the finger.

5. The optical module according to claim 2, wherein the support has another bridge for securing the finger with the first and second leg portions.

6. The optical module according to claim 5, wherein a level of the bridge relative to the bottom surface of the base is greater than a level of the other bridge relative to the bottom surface of the base.

7. The optical module according to claim 5, wherein the other bridge is spaced from the outer surface of the stem.

8. The optical module according to claim 5, wherein the support further includes first and second arms provided on sides of the first and second leg portions for connecting the other bridge to the first and second leg portions, the first and second arms being connected with each other by the other bridge.

9. The optical module according to claim 8, wherein the other bridge has an inner side facing to the bridge, the finger being provided on the inner side.

10. The optical module according to claim 9, further comprising a circuit board provided in the housing,
    wherein the optical subassembly has a lead terminal, connected to the circuit board.

11. An optical module comprising:
    an optical subassembly including a semiconductor optical device therein, the optical subassembly having a cylindrical outer shape;

a support including first and second leg portions and a bridge connecting the first and second leg portions, the first and second leg portions securing the optical subassembly therebetween;

a housing including a base and a cover, the base having a bottom surface for mounting the optical subassembly thereon and coming in contact with tips of respective leg portions of the support; and a thermal sheet provided between the cover and the bridge, wherein the support reduces a stress applied to the optical subassembly from the cover through the thermal sheet and forms a thermal path from the optical subassembly to the cover.

12. The optical module according to claim 11, wherein thermal sheet is made of silicon gel containing at least one of metal pieces, metal powders, ceramic pieces, and ceramic powders.

13. The optical module according to claim 12, wherein the thermal sheet has a thermal conductivity of 2 W/m/K or more than 20 W/m/K or less.

14. The optical module according to claim 12, wherein the thermal sheet shore hardness of 15 or more and 50 or less.

15. The optical module according to claim 11, wherein respective leg portions include a finger curved so as to be in contact with a side of the optical subassembly.

16. The optical module according to claim 15, wherein the finger is in contact with the stem with a solder.

17. The optical module according to claim 11, wherein the bridge is not in contact with the side of the optical subassembly.

* * * * *